United States Patent [19]

Redlich

[11] Patent Number: 4,602,174

[45] Date of Patent: Jul. 22, 1986

[54] ELECTROMECHANICAL TRANSDUCER PARTICULARLY SUITABLE FOR A LINEAR ALTERNATOR DRIVEN BY A FREE-PISTON STIRLING ENGINE

[75] Inventor: Robert W. Redlich, Athens, Ohio

[73] Assignee: Sunpower, Inc., Athens, Ohio

[21] Appl. No.: 720,004

[22] Filed: Apr. 4, 1985

Related U.S. Application Data

[63] Continuation of Ser. No. 556,791, Dec. 1, 1983, abandoned.

[51] Int. Cl.$^4$ .............................................. H02K 33/00
[52] U.S. Cl. ...................................... 310/15; 290/1 R
[58] Field of Search ............................ 310/12–14, 310/30, 168, 268, 15; 290/1 R

[56] References Cited

U.S. PATENT DOCUMENTS

| | | | |
|---|---|---|---|
| 3,136,934 | 6/1964 | Henry-Baudot | 310/268 X |
| 3,470,408 | 9/1969 | Lewis et al. | 310/168 |
| 4,346,318 | 8/1982 | Shtrikman | 310/12 |
| 4,349,757 | 9/1982 | Bhate | 310/30 X |
| 4,454,426 | 6/1984 | Benson | 310/15 X |

*Primary Examiner*—Donovan F. Duggan
*Attorney, Agent, or Firm*—Frank H. Foster

[57] ABSTRACT

An electromechanical transducer particularly useful as a linear alternator driven by a free-piston Stirling engine is disclosed. A relatively high permeability material is formed into a flux loop having at least a pair of spaced gaps formed transversely through the loop. The gaps are aligned along a reciprocation path for a magnet which is mechanically mounted for reciprocation between alternate positions within the gaps. The magnet has a magnetization vector transverse to the reciprocation path and is drivingly linked to a mechanical energy input or output for operation respectively as an alternator or motor. The armature coil is wound around a portion of the flux loop.

9 Claims, 10 Drawing Figures

ELECTROMECHANICAL TRANSDUCER PARTICULARLY SUITABLE FOR A LINEAR ALTERNATOR DRIVEN BY A FREE-PISTON STIRLING ENGINE

This is a continuation, of application Ser. No. 556,791 filed Dec. 1, 1983 now abandoned.

FIELD OF THE INVENTION

This invention relates generally to electromechanical transducers of the electromagnetic type used as electric motors and generators and more particularly relates to a transducer which has a relatively small reciprocating mass and which is particularly advantageous for use in a linearly reciprocating alternator.

BACKGROUND OF THE INVENTION

All electromagnetic types of electromechanical transducers for converting energy between a mechanical form and an electrical form operate on the same basic principles utilizing a time change of magnetic flux through a coil of wire. The differences between them lie in their practicality and relative efficiency.

In order to optimize efficiency and practicality, a variety of different parameters must be considered and optimized. For example, in a linearly reciprocating machine, such as a linear alternator, it is desirable to minimize the mass which must be driven in reciprocation in order to minimize the momentum which must be overcome by the driving forces. Similarly, it is desirable to minimize the total mass of an electrical alternator in order to provide the maximum ratio of energy output to alternator weight.

One way to help accomplish this is to maximize the electric current at which the machine can operate before the transformer iron, which is used to provide a high permeability flux path, begins to saturate. The flux causing saturation arises from two components, one from the source of magnetic flux, such as a permanent magnet and the other from the current induced in the armature winding. The latter source, referred to as the armature reaction flux, is proportional to the armature current divided by air gap distance. Thus, reducing the armature reaction flux by increasing the number of working gaps permits a higher operating current before saturation.

A goal in the design of a linear alternator intended to be driven by a Stirling engine is that it be axially symmetrical so that it can be rotated or spun about its central axis in order to permit the advantages of spin lubrication of a free-piston Stirling engine as described in U.S. Pat. No. 4,330,993.

A variety of alternator designs have been suggested in the prior art but different ones of them have inherent weaknesses. Some designs require the use of two different magnets for obtaining flux reversal, one for each oppositely directed flux polarity. Others utilize multiple magnets which have their poles interfacing in a manner to oppose or buck each other. These cause unnecessary complexity compared to the present invention.

Other designs are electrically inefficient, in that the magnet flux is sufficient to nearly saturate the iron, leaving only a small margin for armature reaction. Optimum design, approached by present invention, is to have equal armature reaction flux and magnet flux at iron saturation. This maximizes the power to weight ratio.

Further, it is well known that the relative motion of a magnet with respect to iron core material creates a substantial magnetic spring force tending to move the magnet toward a position of equilibrium. In some devices the equilibrium position is intermediate the opposite boundaries of the reciprocation path. However, if a linear alternator is driven by a free-piston Stirling engine, it is desirable that the linear alternator have two positions of equilibrium relatively near the opposite ends of the reciprocation path to facilitate starting the engine.

It is desirable that each turn of the windings be of minimum length and that the windings be wound compactly.

In some designs, one of the relatively reciprocating parts reciprocates into a space which could otherwise be occupied by winding conductors. This increases the weight by requiring more iron to position the windings away from moving magnets.

Still other designs, such as that prior art illustrated in FIG. 1, generate waveforms with undesirable characteristics as described below.

BRIEF SUMMARY OF THE INVENTION

The present invention is an electromechanical transducer having a flux loop formed of a relatively high permeability material with at least a pair of spaced gaps formed transversely through the loop and aligned along a reciprocation path. A coil is wound around the loop to provide for magnetic coupling with the flux loop and electrical connection to the external circuitry. A magnet is mechanically mounted for reciprocation along the reciprocation path to alternate positions within the two gaps. The magnet has a magnetization vector which is transverse, and preferably perpendicular, to the reciprocation path and across the gap. The magnet is drivingly linked to a mechanical energy input or output for operation as an alternator or motor respectively.

The present invention differs from prior art devices in a variety of ways most notably including: only the magnet itself reciprocates, essentially no iron mass reciprocates; the fundamental embodiment of the present invention requires a single magnet within two gaps whereas others require two, sometimes in opposing relationship; the magnet of the present invention goes into the gaps rather than across a gap; and the magnet is magnetized across the gap preferably perpendicularly to its reciprocation path.

Because the armature reaction flux passes through two gaps instead of one, the armature reaction flux is reduced thus permitting higher operating currents. As a consequence, electromechanical transducers in accordance with the present invention exhibit a power to weight ratio which is an improvement over the prior art by a factor of at least two. This results in part because the total mass is less and more particularly because the mass which must reciprocate consists solely of the magnets themselves. None of the high permeance flux path is reciprocated. This also results in part because in the present invention the flux induced by the magnet is about equal to the armature reaction flux. Their copper windings are used more efficiently because of the geometric configuration of the present invention which gives a high ratio of flux through the windings to length of wire in the windings.

Figure 1:
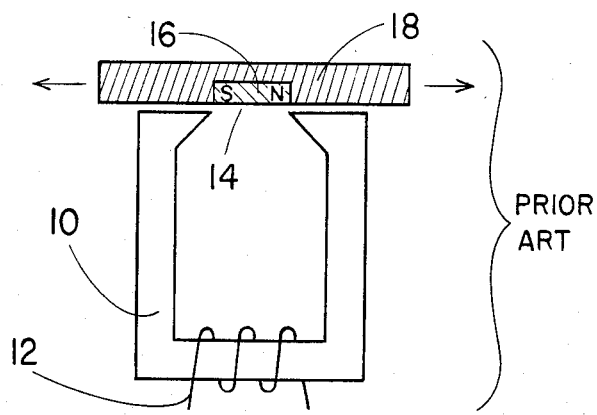
FIG. 1 is a simplified schematic diagram illustrating the principles of some prior art electromechanical transducers.

In describing the preferred embodiments of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

FIG. 1 illustrates the principles of operation of devices which are numerous in the prior art. Such a device has a flux loop 10 formed by a relatively high permeability material around which an armature coil 12 is wound. A gap 14 is provided in the path A magnet 16 is embedded in a high permeability material 18 and is polarized in the direction of its reciprocation. The device of FIG. 1 induces a time changing flux in the flux loop 10 as the magnet 16 crosses the gap 14. When the magnet 16 is positioned directly opposite a pole piece essentially no magnetic flux is set up in the flux path 10. The result is that during much of the cycle time there is not much flux change except as the magnet crosses the gap. Therefore that structure tends to generate voltage spikes of relatively short duration.

U.S. Pat. No. 4,346,318 illustrates an electric motor which is somewhat different. It has a pair of oppositely polarized, adjacently mounted magnets which are reciprocated within a single gap.

Figure 2:
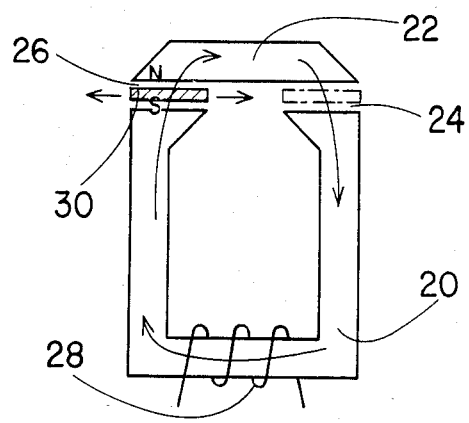
FIG. 2 is a schematic diagram illustrating in its most simplified form the basic principles of operation of embodiments of the invention.

FIG. 2 represents the present invention in its most simplified form. In the embodiment of FIG. 2 a flux loop is formed of a high permeability material in two segments, a principle segment 20 and a relatively minor segment 22. The two segments are separate because in embodiments of the present invention there are at least two spaced gaps formed transversely through the flux loop. These two gaps 24 and 26 must also be aligned along a reciprocation path. An armature coil 28 is wound around the loop.

A magnet 30, which is a permanent magnet or other source of magnetic flux, is mechanically mounted for reciprocation along the reciprocation path to alternate positions within the gaps 24 and 26. The magnet 30 has a magnetization vector transverse to and preferably perpendicular to the reciprocation path so that it is magnetized across the gap. The magnet 30 sets up a flux in the flux loop which varies nearly linearly with respect to magnet position during reciprocation. Therefore, it induces an e.m.f. which closely approximates a sinusoid. The flux set up in the flux path is in one direction, as illustrated in FIG. 2 when it is in the gap 26, and will be in the opposite direction when the magnet is moved to the gap 24.

The magnet is preferably a permanent magnet i.e., it exhibits a high residual flux and a high coercive force. Preferably it is a rare earth cobalt permanent magnet most preferably having a linear demagnetization curve, such as samarium cobalt. The flux loop is formed of a high permeability material such as conventional transformer iron.

Thus, in the operation of the embodiment of FIG. 2 an alternating electromotive force or e.m.f. is induced in the coil 28 by reciprocating essentially only the magnet 30 between alternate positions within gaps 24 and 26 while maintaining the magnetization vector of the magnet 30 transverse to the path of reciprocation. The reciprocating mass is substantially devoid of any attached ferromagnetic flux path and therefore excess mass, such as iron, is not required to be driven in reciprocation.

Figure 3:
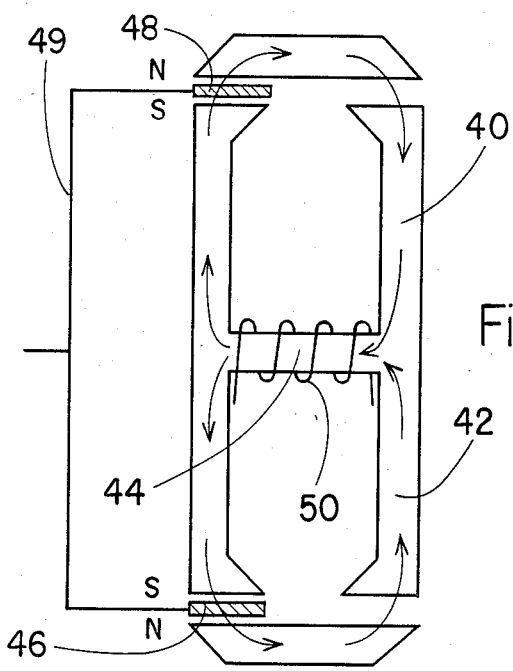
FIG. 3 is a schematic diagram of a symmetrical doubled-ended embodiment of the invention created by a reflection or revolution of the embodiment of FIG. 2.
Figures 4, 5, 6:
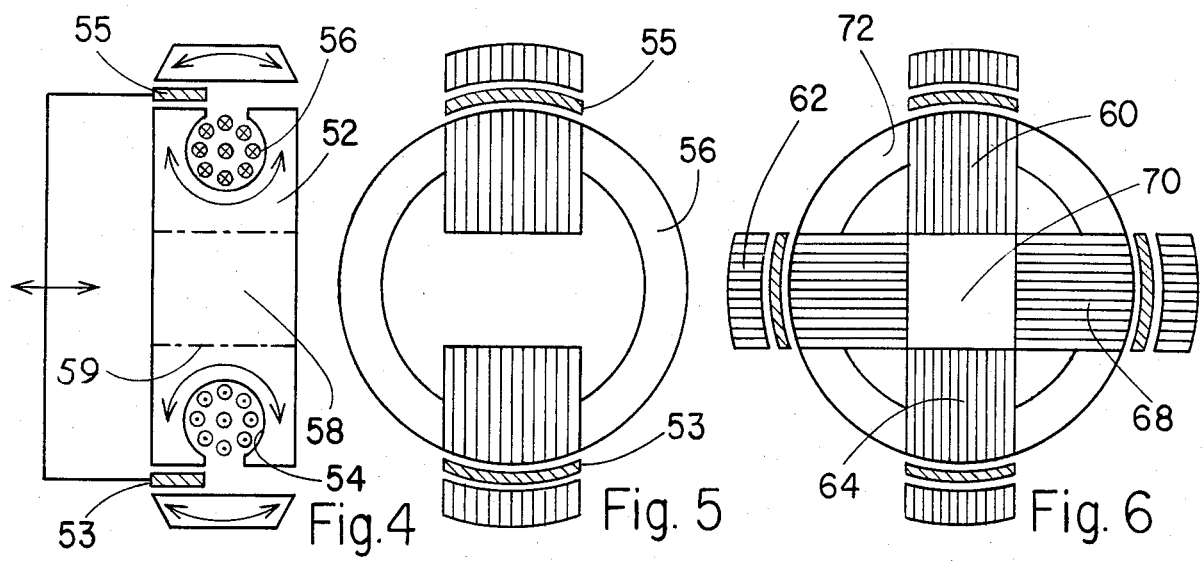
FIGS. 4, 5, 6 and 7 are schematic diagrams of embodiments of the invention of a type illustrated in FIG. 3.

The fundamental, simple system illustrated in FIG. 2 may be extended and made double-ended as shown in FIG. 3 or FIG. 4.

FIG. 3 represents the addition of a mirror image onto the embodiment of FIG. 2 with the lower segment being a reflection of the upper. This consists of two different flux loops 40 and 42 which share a common leg 44 on which a single winding 50 is wound. The magnets 46 and 48 are mechanically linked together, shown symbolically as link 49, in connection with a mechanical energy input or output device for utilizing the device as a generator or motor. In the embodiment of FIG. 3 the reciprocation of the magnets 46 and 48 sets up flux in the two flux loops and the flux adds in the intermediate leg 44 around which the coil 50 is wound. Since each turn encircles both flux loops, the ratio o flux to winding length is improved.

The shape of the high permeability material of FIG. 3 may be physically modified so that the flux paths are as shown in FIG. 4. In the high permeability mass 52 an annular peripheral channel 54 is formed within which the coil 56 may be wound. As a further alternative, the central portion of the high permeability material 52 may be omitted between phantom lines 57 and 59 to simplify fabrication of the laminated structure. Electrically the structure consists of two oppositely directed flux paths and cooperating reciprocating magnets of the type illustrated in FIG. 2. The flux paths are spaced from each other but both are surrounded by the coil 56.

While FIG. 4 is a cross sectional view, FIG. 5 is an end view of the embodiment of FIG. 4 with the central portion of the high permeability material omitted. Furthermore, the embodiment of FIG. 5 may be duplicated in quadrature in order to provide the embodiment illustrated in FIG. 6. FIG. 6 consists essentially of four flux loops 60, 62, 64 and 68 oriented at 90° to each other about a central axis 70 and wound with a coil 72. Each of those four flux paths is like that illustrated in FIGS. 2 and 4 and the single coil 72 surrounds all four flux paths thereby improving the efficiency even over the structure of FIG. 3 by further improving the flux to winding length ratio.

Figure 7:
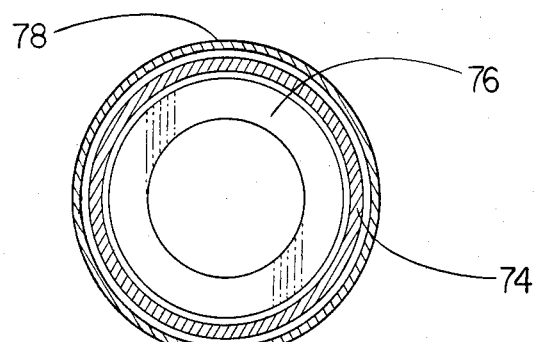

Further, the view of the embodiment of FIG. 4 may be continuously revolved around its central axis to provide a circular, axially symmetrical embodiment illustrated in FIG. 7 having essentially the same cross-sectional diagram as FIG. 4. In that embodiment, the reciprocating magnets become a single, circular band 74 surrounding and passing between poles formed in the flux loop consisting of a major inner ring 76 and a minor outer ring 78. The coil is wound in a groove which is formed inwardly of the outer surface of the inner ring 76.

A principle advantage of the embodiment of FIG. 7 is that the magnet 74 may not only be reciprocated between the two gaps, in a direction inwardly and outwardly of the page in FIG. 7, but may also be rotated about its central axis without any effect upon its ability to generate the flux changes required to induce an e.m.f. in the armature coil. This is particularly useful with a linear alternator which is mechanically linked to the power piston of a free piston Stirling engine which is being spun in order to obtain the advantages of hydrodynamic lubrication described in U.S. Pat. No. 4,330,993.

All of the magnets illustrated in the figures reciprocate along parallel linear reciprocation paths. The parallel, linear paths of FIGS. 5 and 6 are positioned in cylindrical arrangement about the central axis. Other reciprocation paths, such as arcuate, can be used within the concepts of the present invention.

Figure 8:
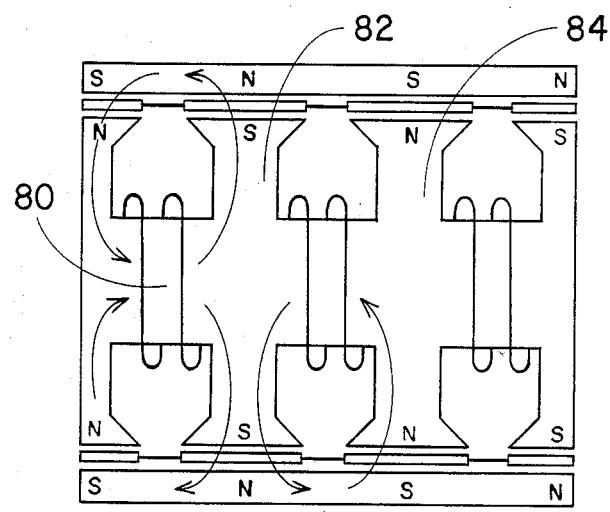
FIG. 8 is a schematic diagram of an alternative embodiment of the invention.

Flux loops of the present invention may also be formed in a cascaded series of adjoining loops such as illustrated in FIG. 8. FIG. 8 is merely a cascaded series of repetitions of the type of embodiment illustrated in FIG. 3. It has cascaded repetitions of two loops having a common central leg, such as central leg 80, as illustrated in FIG. 3 and in addition adjoining loops share side legs, such as legs 82 and 84.

The embodiments of FIGS. 3-8 illustrate the reciprocating magnet or magnets positioned outwardly of the major flux path and the armature coils. However, the relative positions may be reversed so that the armature coils are outwardly of the reciprocating magnets. These analogous situations are illustrated in FIG. 9.

Figure 9:
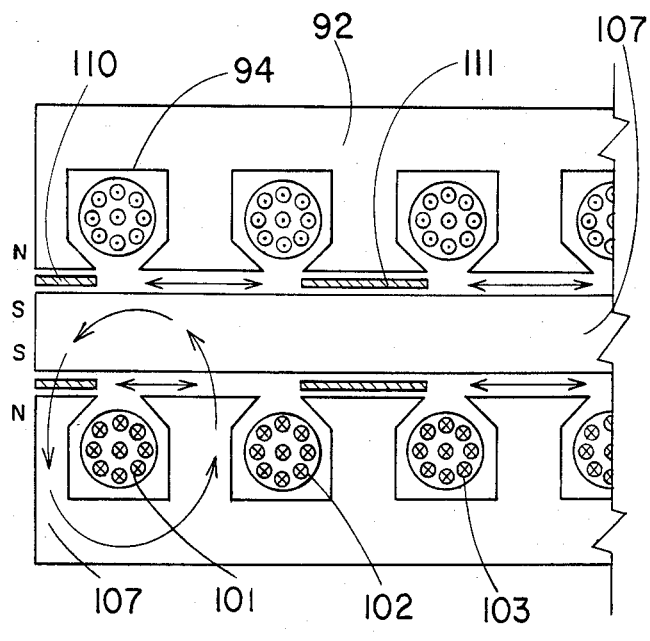
FIG. 9 is an alternative embodiment of the invention in which the reciprocating magnets reciprocate in a path which is inward of the armature coil rather than outward as illustrated in the embodiments of FIGS. 3–7.

In FIG. 9 a ferromagnetic, tubular outer core 92 has a plurality of annular channels, such as channel 94, formed inwardly of its central cylindrical passageway. A plurality of armature coils 101, 102, 103 and so forth, are wound within these channels. The outer cylindrical core 92 forms the major flux path. A minor flux path, 107, is formed by a central, axial, linear rod inserted within the tubular outer path. This rod remains stationery relative to the outer core 92 during operation.

The magnets, such as magnets 110 and 111, are mechanically linked together and drivingly linked to a mechanical energy input or output. They are preferably circular magnets having the polarity shown.

Figure 10:
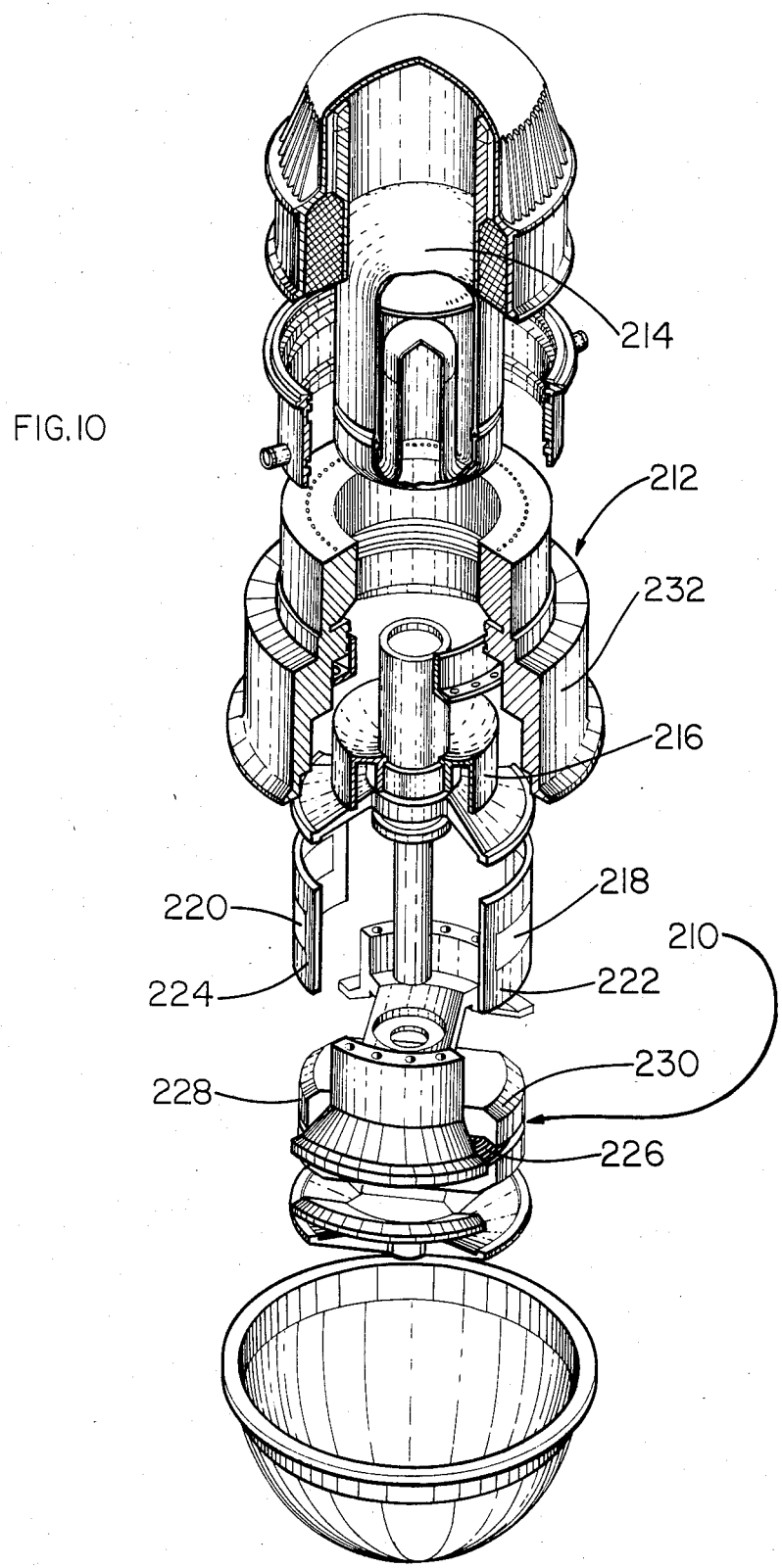
FIG. 10 is an exploded view of a preferred embodiment of the invention.

FIG. 10 illustrates a realistic, nondiagramatic embodiment of the invention. It shows an alternator 210 in accordance with the present invention driven by a free piston Stirling engine 212. The engine has a displacer 214 and power piston 216. The power piston 216 is linked to a pair of magnets 218 and 220 which are mounted to nonferromagnetic, such as aluminum, supports 222 and 224. These are driven in reciprocation across the gaps 226 and 228 formed in the iron flux path material 230 which is formed in the manner of the embodiment of FIGS. 4 and 5, except that the central portion is not removed from the iron core material. The minor portion of the flux path 232 is a part of the exterior housing.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. An electromechanical transducer comprising:
   (a) a plurality of flux loop members formed of a relatively high permeability material, each said flux loop member being stationary relative to the below said magnetic flux source and extending generally radially outwardly from a central axis to define a closed flux loop, each flux loop member having a pair of spaced gaps formed transversely through said loop member to provide two gaps in each magnetic flux loop member, said gaps being aligned along a reciprocation path parallel to said central axis;
   (b) a central armature coil wound to encircle the central portions of all of said loop members; and
   (c) a magnetic flux source mechanically mounted for reciprocation along said reciprocation path to alternate positions within said gaps each alternate position providing a reversal of flux direction, said source having a generally radial magnetization vector transverse to said reciprocation path and across said gap in the same radial direction at every gap and drivingly linked to a mechanical energy input or output.

2. An electromechanical transducer in accordance with claim 1 wherein said flux path loop has a plurality of pairs of said spaced gaps and a magnet in accordance with claim 2 is associated with each of said pairs.

3. An electromechanical transducer in accordance with claim 2 wherein each pair of gaps is formed along parallel, linear reciprocation paths.

4. An electromechanical transducer in accordance with claim 1 wherein there are a plurality of said flux loops formed in a cascaded series of adjoining loops having their gaps aligned along parallel reciprocation paths.

5. An electromechanical transducer in acordance with claim 1 wherein said flux loop is symmetrical about a central axis and said reciprocation path is cylindrical.

6. An electromechanical transducer in accordance with claim 5 wherein said armature coil is wound about said central axis.

7. An electromechanical transducer in accordance with claim 1 wherein said armature coil is wound inwardly of said magnet.

8. An electromechanical transducer in accordance with claim 1 wherein said armature coil is wound outwardly of said magnet.

9. A method of inducing an alternating e.m.f. in a coil wound about a flux loop member formed of a relatively high permeability, ferromagnetic material, said method comprising: reciprocating substantially only a magnetic flux source which is substantially devoid of any attached ferromagnetic flux path member and has the magnetization vector of portions of the magnetic flux source in the same direction between alternate positions within a pair of spaced gaps formed in said loop member while maintaining the magnetization vector of said source transverse to the path of reciprocation, and maintaining said flux path member stationary relative to said flux source.

* * * * *